United States Patent
Sladecek et al.

(10) Patent No.: US 10,517,433 B2
(45) Date of Patent: Dec. 31, 2019

(54) APPARATUS FOR PREPARING FOOD HAVING AN IMPROVED THERMAL PROTECTION

(71) Applicant: KONINKLIJKE PHILIPS N.V., Eindhoven (NL)

(72) Inventors: Marcel Sladecek, Eindhoven (NL); Davide Bonaccorso, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 416 days.

(21) Appl. No.: 15/125,619

(22) PCT Filed: Feb. 27, 2015

(86) PCT No.: PCT/EP2015/054178
§ 371 (c)(1),
(2) Date: Sep. 13, 2016

(87) PCT Pub. No.: WO2015/139934
PCT Pub. Date: Sep. 24, 2015

(65) Prior Publication Data
US 2017/0000293 A1  Jan. 5, 2017

(30) Foreign Application Priority Data
Mar. 18, 2014 (EP) .................................... 14160445

(51) Int. Cl.
*A47J 37/12* (2006.01)
(52) U.S. Cl.
CPC ................. *A47J 37/1266* (2013.01)
(58) Field of Classification Search
CPC .......... A47J 37/0614; A47J 37/1266

USPC ....... 99/282, 323.9, 327, 453, 483; 219/386, 219/395, 401, 412, 413, 626, 723
See application file for complete search history.

(56) References Cited

U.S. PATENT DOCUMENTS

| | | | | |
|---|---|---|---|---|
| 1,944,449 A | * | 1/1934 | Munro ................. | H05B 3/0014 432/50 |
| 3,686,476 A | * | 8/1972 | Schauer, Jr. ............ | F24C 14/02 219/393 |
| 4,491,065 A | * | 1/1985 | Poulson ................. | F24C 15/325 99/327 |

(Continued)

FOREIGN PATENT DOCUMENTS

| CN | 202751194 U | 2/2013 |
|---|---|---|
| EP | 1121884 A1 | 8/2001 |

(Continued)

*Primary Examiner* — Thien S Tran (57) ABSTRACT

The invention relates to an apparatus (100) for preparing food. The apparatus comprises a food preparation chamber (101) having an outer wall (102), an air heating system to circulate hot air (103) inside the food preparation chamber (101), air cooling system to circulate cool air (104) on said outer wall (102) outside the food preparation chamber (102), a thermal fuse system (105) to cut the electrical supply of said apparatus when the temperature of the thermal fuse system (105) exceeds a given threshold (TH), the thermal fuse system (105) being attached to said outer wall (102) outside the food preparation chamber (101), a cover element (106) placed at the proximity of said thermal fuse system (105) to protect the thermal fuse system (105) from the cool air. This invention improves the thermal protection of the apparatus.

11 Claims, 11 Drawing Sheets

(56) References Cited

U.S. PATENT DOCUMENTS

| | | | |
|---|---|---|---|
| 4,677,831 A | 7/1987 | Wunner | |
| 6,341,601 B1 * | 1/2002 | Ward | A21B 1/48 |
| | | | 126/21 R |
| 9,353,954 B2 | 5/2016 | Linnewiel | |
| 2003/0047554 A1 | 3/2003 | Wang | |
| 2013/0295245 A1 | 11/2013 | Gardner | |
| 2014/0020670 A1 * | 1/2014 | Lee | F24C 15/322 |
| | | | 126/21 A |

FOREIGN PATENT DOCUMENTS

| | | |
|---|---|---|
| EP | 1772086 A1 | 4/2007 |
| JP | 5962413 U | 4/1984 |
| JP | 6364283 A | 3/1988 |
| JP | 2003284648 A | 10/2003 |
| JP | 2012022906 A | 2/2012 |
| WO | 2010082005 A2 | 7/2010 |
| WO | 2010144758 A1 | 12/2010 |

* cited by examiner

APPARATUS FOR PREPARING FOOD HAVING AN IMPROVED THERMAL PROTECTION

This application is the U.S. National Phase application under 35 U.S.C. § 371 of International Application No. PCT/EP2015/054178, filed on Feb. 27, 2015, which claims the benefit of International Application No. 14160445.4 filed on Mar. 18, 2014. These applications are hereby incorporated by reference herein.

FIELD OF THE INVENTION

The invention relates to an apparatus for preparing food. The invention may be used in the field of kitchen appliances.

BACKGROUND OF THE INVENTION

Air-based fryers are known for cooking food, for example fries or chicken, wherein the heat for preparing the food is provided by hot air. To heat the food for the preparation and cooking purpose, a stream of hot air, or flow of hot air, is generated to circulate around the food placed in a food preparation chamber.

For user comfort and safety, such type of appliances are generally equipped with an air cooling system that generates cool air outside and around the food preparation chamber, in order to keep the external side of the apparatus below a certain temperature.

Such type of air-based fryers are also equipped with a thermal fuse system that cuts the electrical supply in case a defect in the apparatus would cause an over-increase of temperature above a given value. In order to better detect the over-increase of temperature, the thermal fuse system is generally placed in direct contact with the outer wall of the food preparation chamber, outside the food preparation chamber.

Although the thermal fuse system fully plays its role of cutting electrical supply of the apparatus in case of an over-increase of temperature, the performances of such type of air-based fryers regarding the thermal protection could be further improved.

OBJECT AND SUMMARY OF THE INVENTION

It is an object of the invention to propose an apparatus for preparing food having an improved thermal protection.

The invention is defined by the independent claims. The dependent claims define advantageous embodiments.

To this end, it is proposed an apparatus for preparing food, the apparatus comprising:
- a food preparation chamber having an outer wall,
- an air heating system to circulate hot air inside the food preparation chamber,
- air cooling system to circulate cool air on said outer wall outside the food preparation chamber,
- a thermal fuse system to cut the electrical supply of said apparatus when the temperature of the thermal fuse system exceeds a given threshold, the thermal fuse system being attached to said outer wall outside the food preparation chamber,
- a cover element placed at the proximity of said thermal fuse system to protect the thermal fuse system from the cool air.

Using a cover element placed at the proximity of said thermal fuse system avoids the cool air to blow on the thermal fuse system itself, and avoids the thermal fuse having artificially lower temperature. As a result, in case a defect in the apparatus would cause an over-increase of temperature above a given value, the temperature of the thermal fuse system will increase faster, which in turn will result in cutting the electrical supply of the apparatus faster.

Moreover, with such type of air-based fryers, it may happen that when user stops the apparatus after the use of it, the temperature of the thermal fuse system will continue to increase due to the transfer of heat accumulated in the structure of the apparatus, to the thermal fuse system. The thermal fuse system may thus be damaged, with the need to change it.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1A:
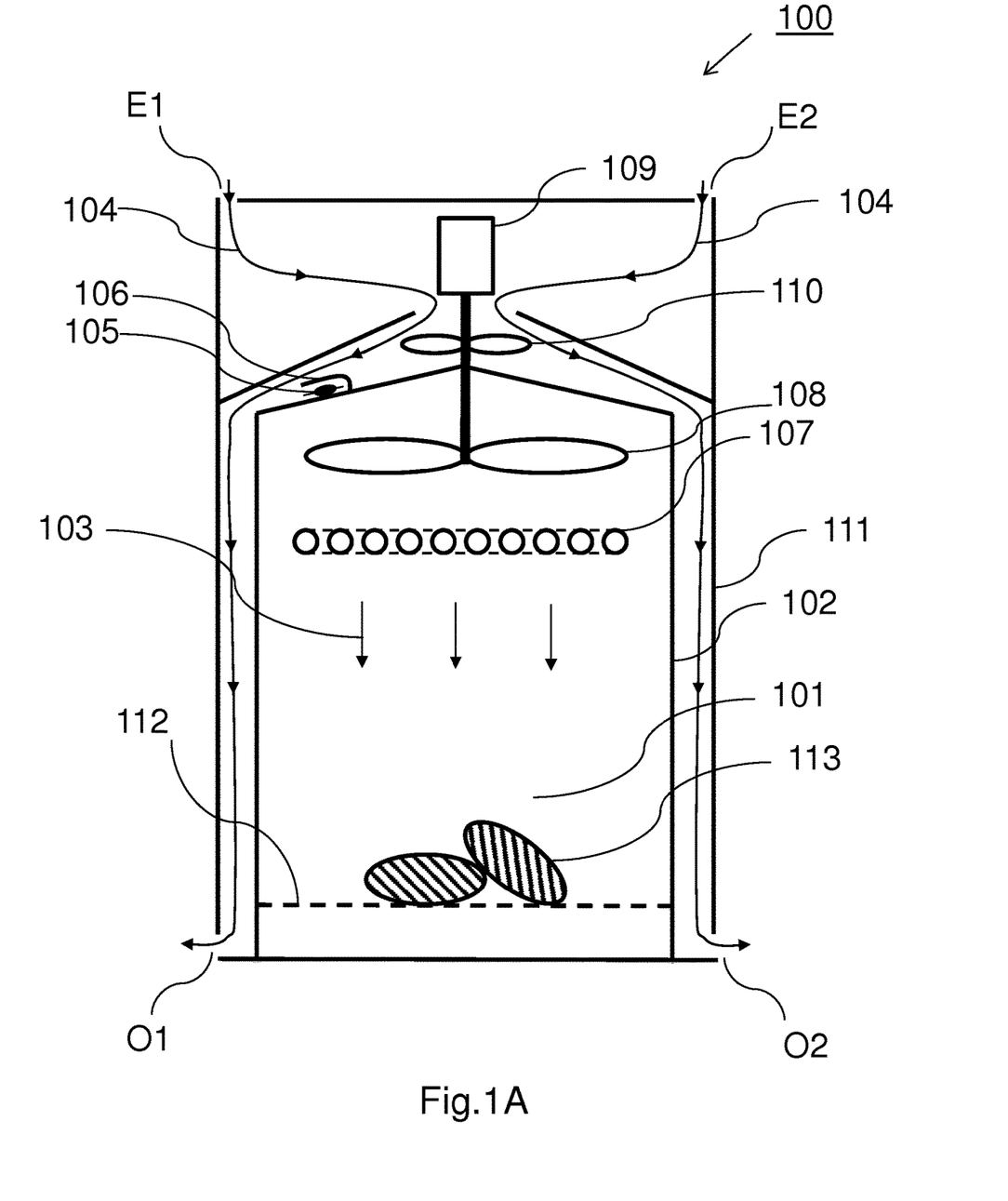
FIG. 1A, FIG. 1B, FIG. 1C depict a first, second, third apparatus according to the invention, respectively.

FIG. 1A depicts an apparatus 100 according to the invention.

The apparatus comprises a food preparation chamber 101 having an outer wall 102.

The apparatus also comprises an air heating system to circulate hot air 103 inside the food preparation chamber 101. For example, the air heating system comprises an electrical heating element 107, a fan 108, and a motor 109. The motor 109 rotates the fan 108, which creates a circulation of air that is heated by heating element 107. As a result, hot air 103 is generated in the food preparation chamber. The heating element 107 may correspond, for example, to a resistive heating element, or a halogen lamp.

The apparatus also comprises an air cooling system to circulate cool air 104 on the outer wall 102 outside the food preparation chamber 101. By cool air, it is meant air having much lower temperature than the hot air 103, such as room-temperature air. For example, the air cooling system comprises a motor, such as motor 109, and a fan 110. The motor 109 rotates the fan 110, which creates a circulation of air between the external wall 111 and the outer wall 102. Air for example enters at entrances E1 and E2, and exits at outputs O1 and O2. The cool air which is circulated outside and around the food preparation chamber 101 avoids that the external wall 111 reaches a too high temperature that could be dangerous for user.

The apparatus also comprises a thermal fuse system 105 to cut the electrical supply of the apparatus when the fuse temperature exceeds a given threshold TH. The thermal fuse system 105 is attached to the outer wall 102 outside the food preparation chamber 101. For example, the thermal fuse system is attached via a strap (not shown). The thermal fuse system comprises at least one thermal fuse (also called "temperature fuse" or "thermal cut-off") preferably inserted on the electrical input of the apparatus. For example, a thermal fuse composed of a fusible alloy with low melting point and special resin, encapsulated in a plastic or ceramic housing, can be used. Under normal operating of the apparatus, the fusible alloy is joined by the two lead wires within the housing. When the thermal cut-off senses an abnormal heat and reaches a pre-set temperature TH, the fusible alloy melts and disconnects the circuit completely with the aid of the special resin. For sake of clarity, the electrical connection of the thermal fuse system is not shown. Other types of thermal fuse, known as such, could be used.

The apparatus also comprises a cover element 106 placed at the proximity of the thermal fuse system 105 to protect the thermal fuse system 105 from the cool air 104. The cover element 106 avoids the incoming cool air 104 to directly blow on the thermal fuse system 105. For example, if the apparatus is a home appliance, the cover 106 is distant from the thermal fuse system 105 from a few millimeters to a few centimeters.

Figure 1B:
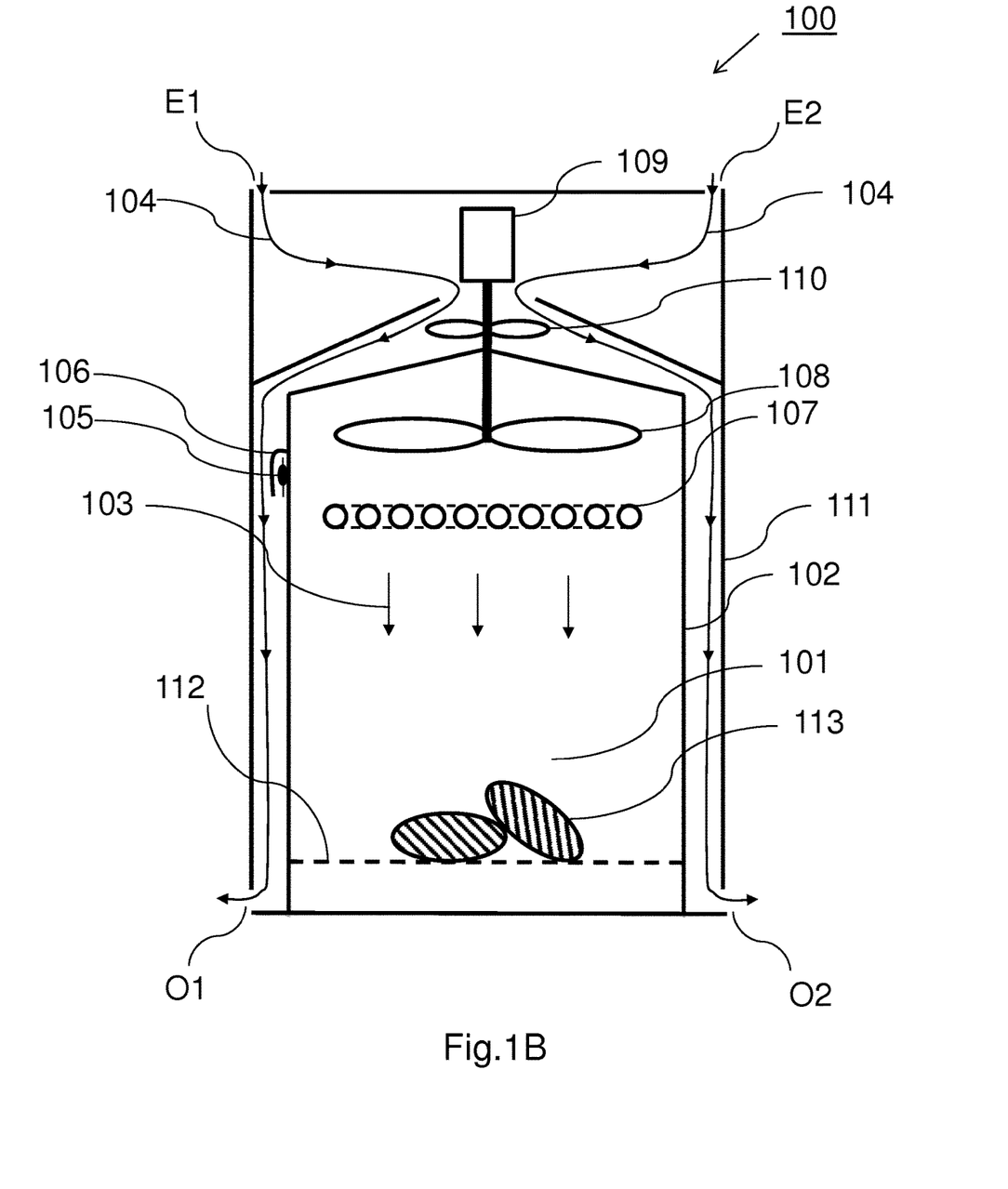

As depicted in FIG. 1A, the thermal fuse system 105 can be placed on an upper part of the outer wall 102. Considering that heat in majority propagates from bottom to top in the apparatus, this position for the thermal fuse system 105 allows a faster detection of an over-increase of temperature in case of a defect in the apparatus. Alternatively, as depicted in FIG. 1B, the thermal fuse system 105 is placed on a lateral part of the outer wall 102.

Regarding use of this apparatus, food portions 113 are placed on a bottom support 112. Access to the inside part of the food preparation chamber 101 and the food portions 113 is for example done via a drawer mechanism that opens on a lateral side of the apparatus (not shown). Preferably, the bottom support 112 is provided with a plurality of openings, indicated by a dashed line, so that hot air can circulate all around the food portions 113.

Figure 1C:
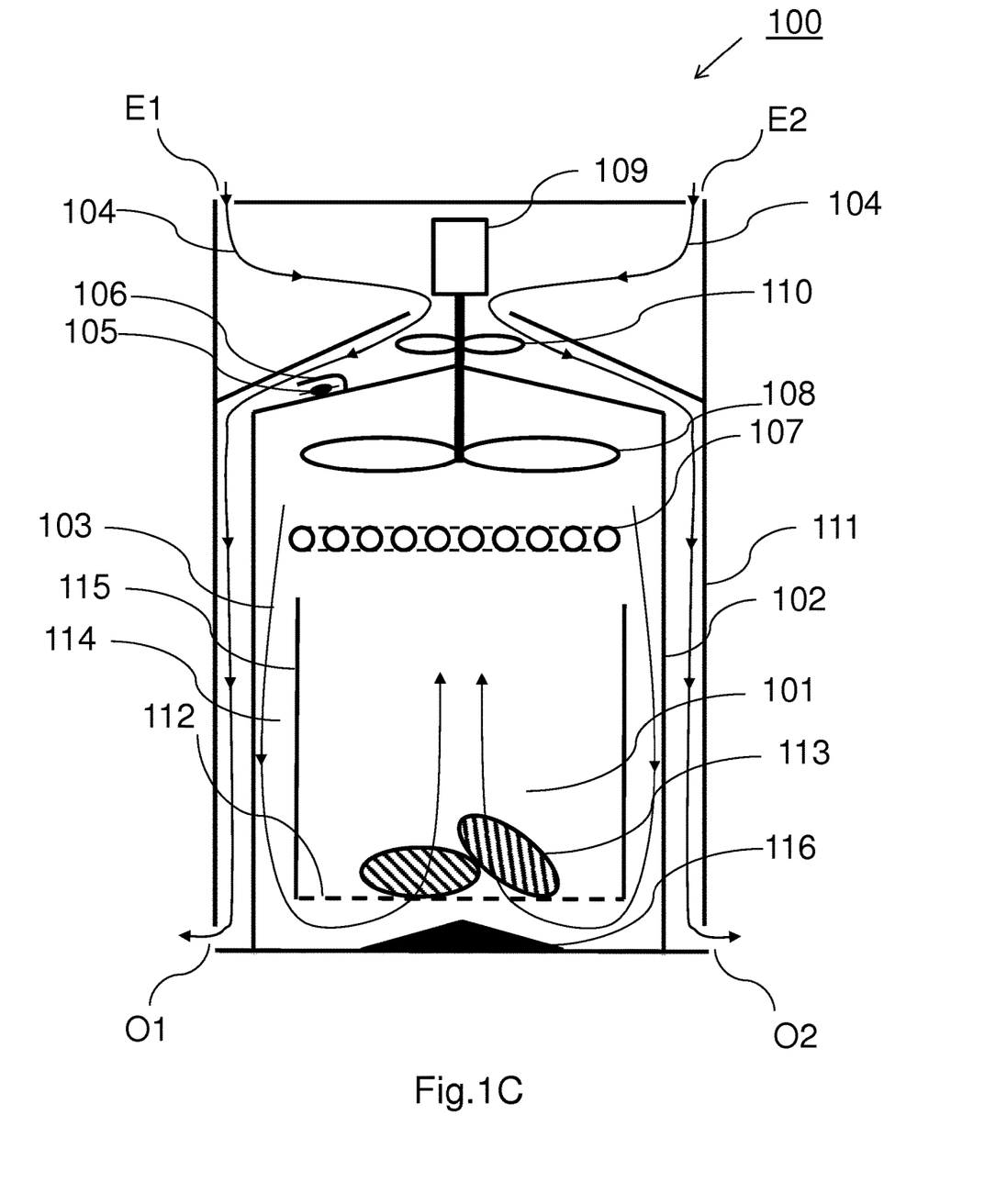

Alternatively, as depicted in FIG. 1C, the apparatus 100 further comprises air guide means 114. The air guide means 114 are intended to guide hot air 103 to the bottom support from below. For example, the air guide means 114 are formed by the space between the outer wall 102 and wall 115 of the food basket in which food portions 113 are placed. Optionally, an air guide member 116 is placed below the bottom support 112 so that hot air evenly flows upwards on food portions from below.

With such type of apparatus, the flow of hot air 103 is provided with a high velocity and high flow rate in the food preparation chamber 101, for example with an air flow rate of 20 liters per second. The term "hot air" relates to an air temperature in the range [60° C.; 250° C.].

Figure 2A:
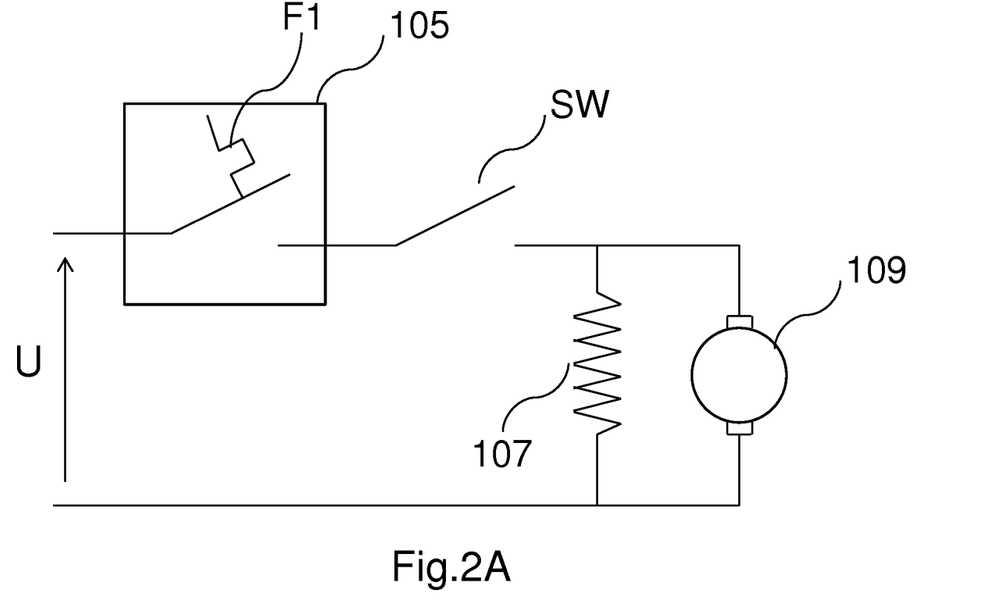
FIG. 2A and FIG. 2B depict a first and a second simplified electrical diagrams of an apparatus according to the invention, respectively.

FIG. 2A depicts a first simplified electrical diagram of an apparatus according to the invention. The power supply U is applied to the apparatus. For example, it corresponds to 220 volts AC. The thermal fuse system 105 is placed at the input and in series so that in case the thermal fuse system triggers, it cuts-off the electrical supply of the apparatus. A switch SW is also inserted in series, in order for the user to start or stop the apparatus. Closing the switch SW closes the electrical circuit and allows the supply of electricity to the heating element 107 and motor 109. The thermal fuse system 105 comprises a thermal fuse F1 that opens the electrical circuit when its temperature exceeds a given and fixed threshold. For example, the thermal fuse F1 is chosen with a cut-off temperature of 176° C.

Figure 2B:
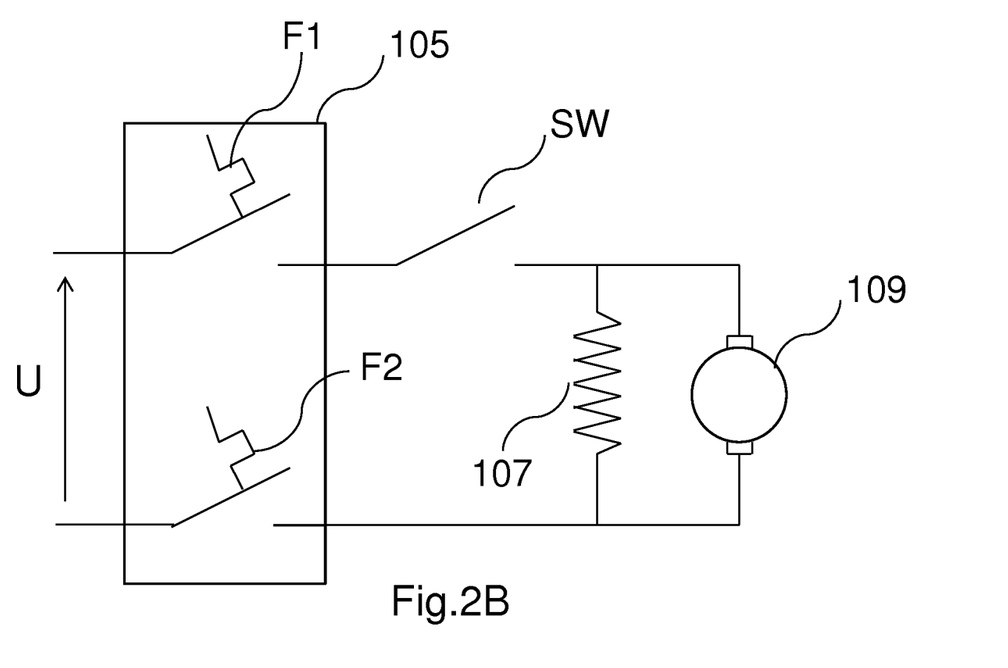

FIG. 2B depicts a second simplified electrical diagram of an apparatus according to the invention. Compared to the electrical diagram of FIG. 2A, it differs in that the thermal fuse system 105 comprises a second thermal fuse F2 placed in series on the second power supply input of the apparatus. The thermal fuse F1 and the thermal fuse F2 have preferably the same cut-off temperature. In case the thermal fuse system 105 triggers, the thermal fuse F1 and the thermal fuse F2 open each power supply input of the apparatus, resulting in a better electrical isolation of the apparatus and improved safety for the user.

Figure 3A:
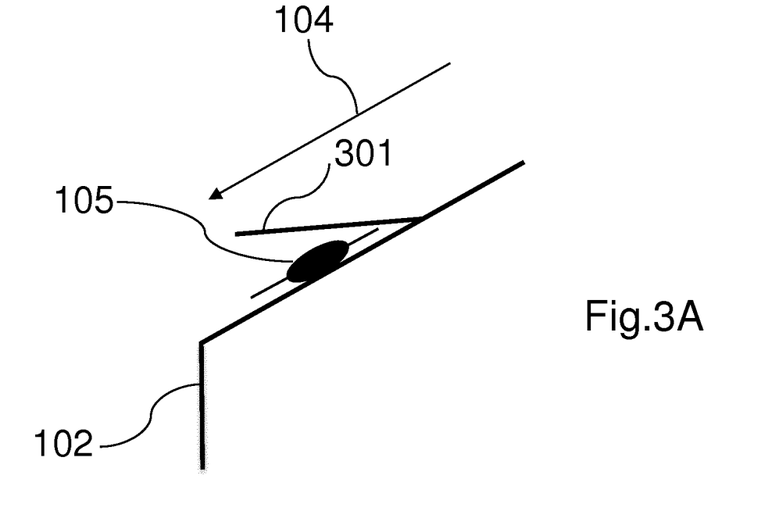
FIG. 3A-3B-3C-3D depict views of a cover element forming a deflector, used in an apparatus according to the invention.
Figure 3B:
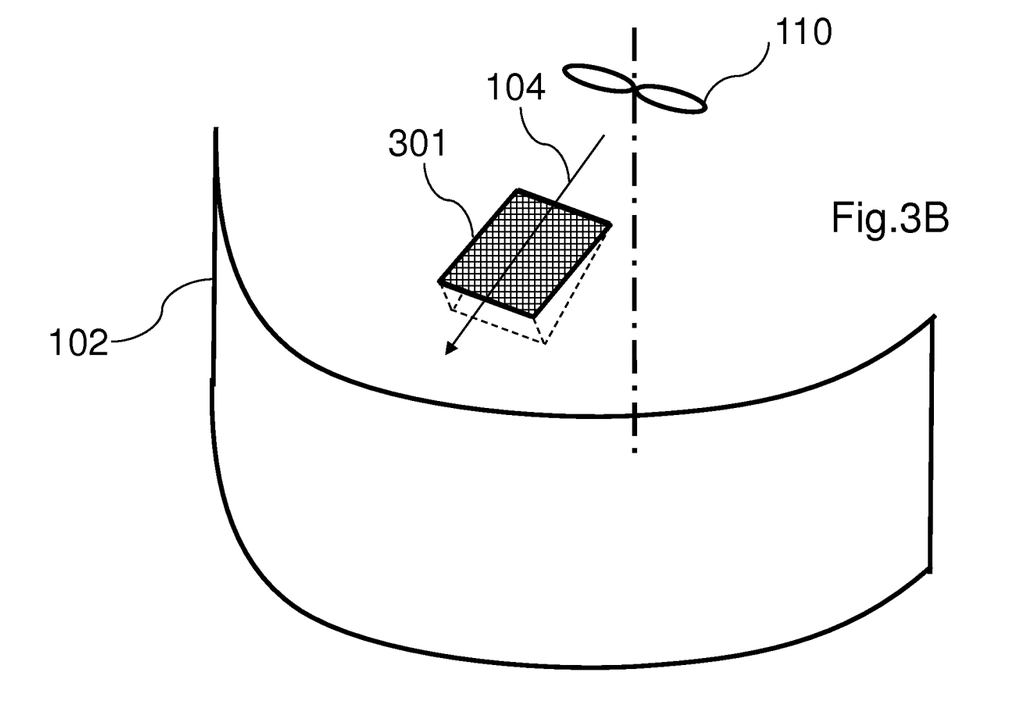
Figure 3C:
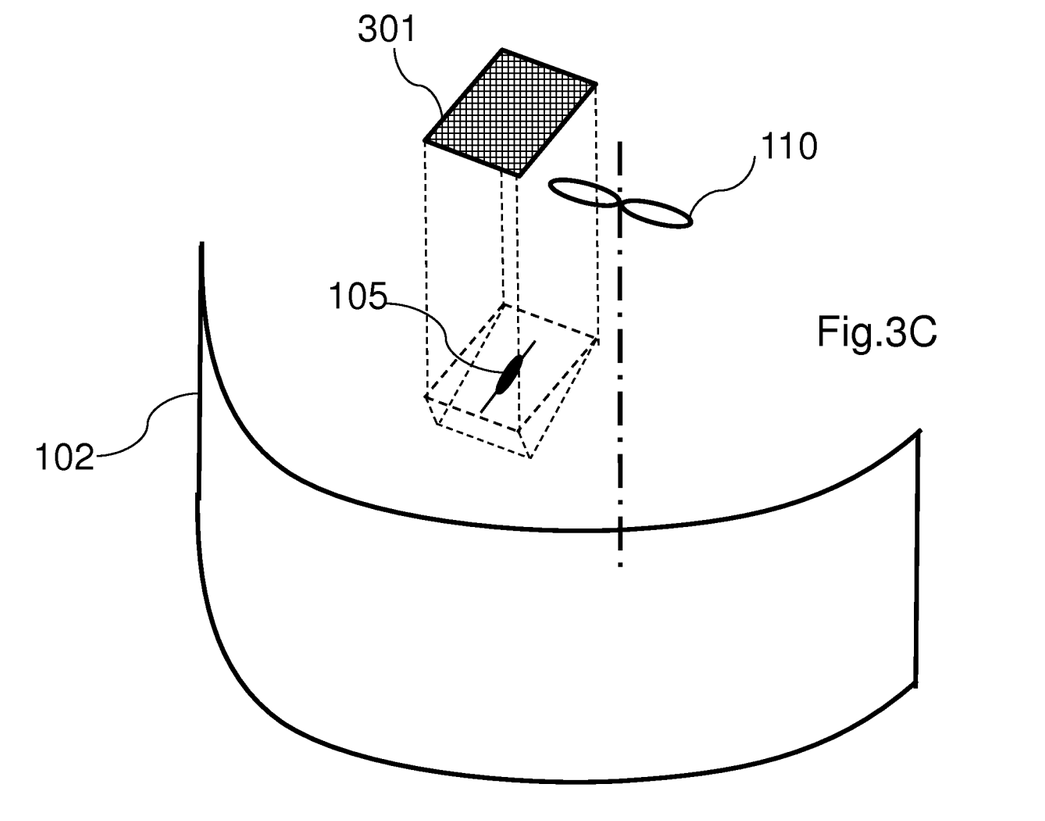
Figure 3D:
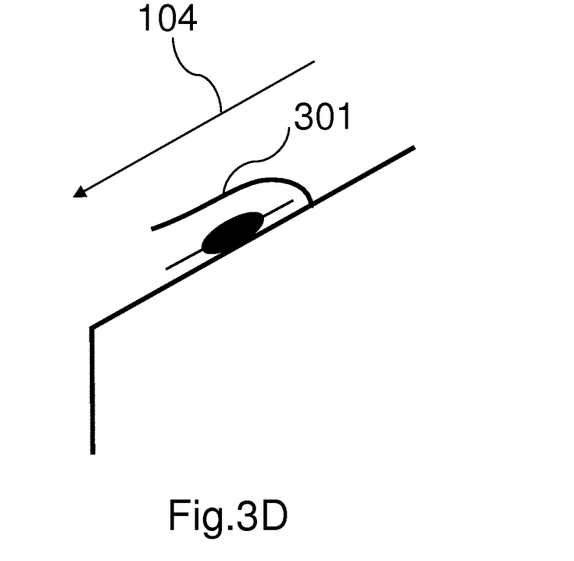

Advantageously, as depicted in FIG. 3A, the cover element 106 forms a deflector 301. The shape of the deflector 301 is preferably flat, with for example a square, rectangular or triangular shape. FIG. 3B depicts corresponding three-dimensional view of the deflector 301. The front and the lateral sides are opened, which is advantageous to connect the electrical cables (not shown) to the thermal fuse system 105. FIG. 3C depicts an exploded corresponding view showing the thermal fuse system 105. Alternatively, as depicted in FIG. 3D, the deflector 301 has a curved longitudinal cross-section to slightly increase the space between the deflector 301 and the outer wall 102, for example to match with the size of the thermal fuse system 105, while offering a low aerodynamic air resistance.

Figure 4A:
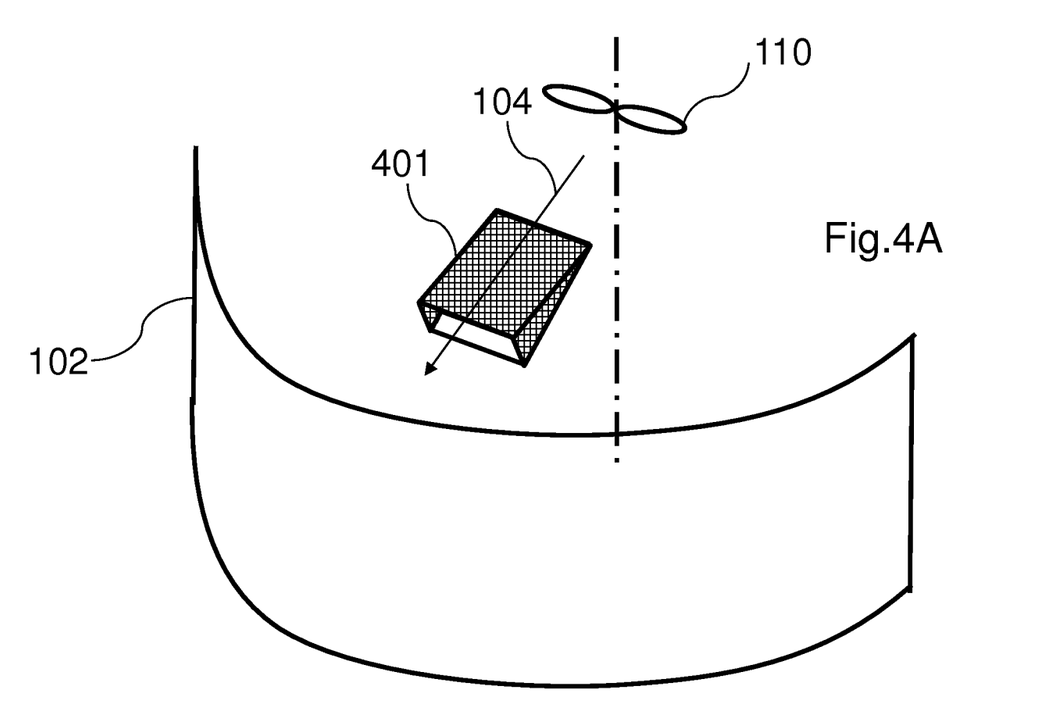
FIG. 4A-4B-4C depict views of a cover element forming a cavity, used in an apparatus according to the invention.
Figure 4B:
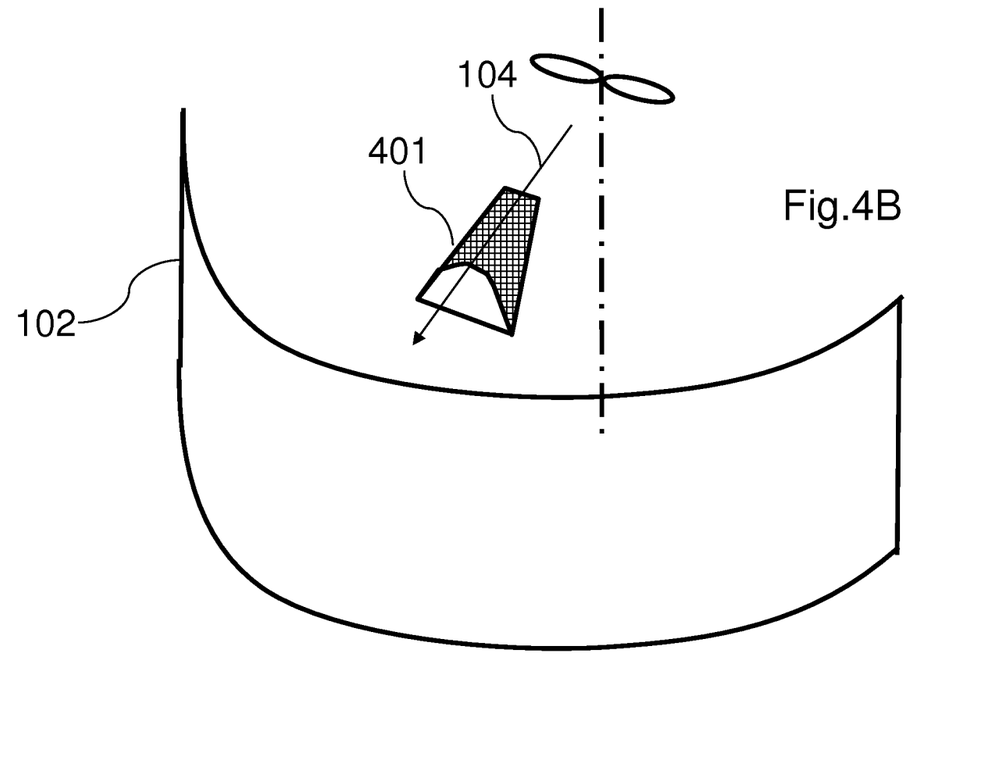
Figure 4C:
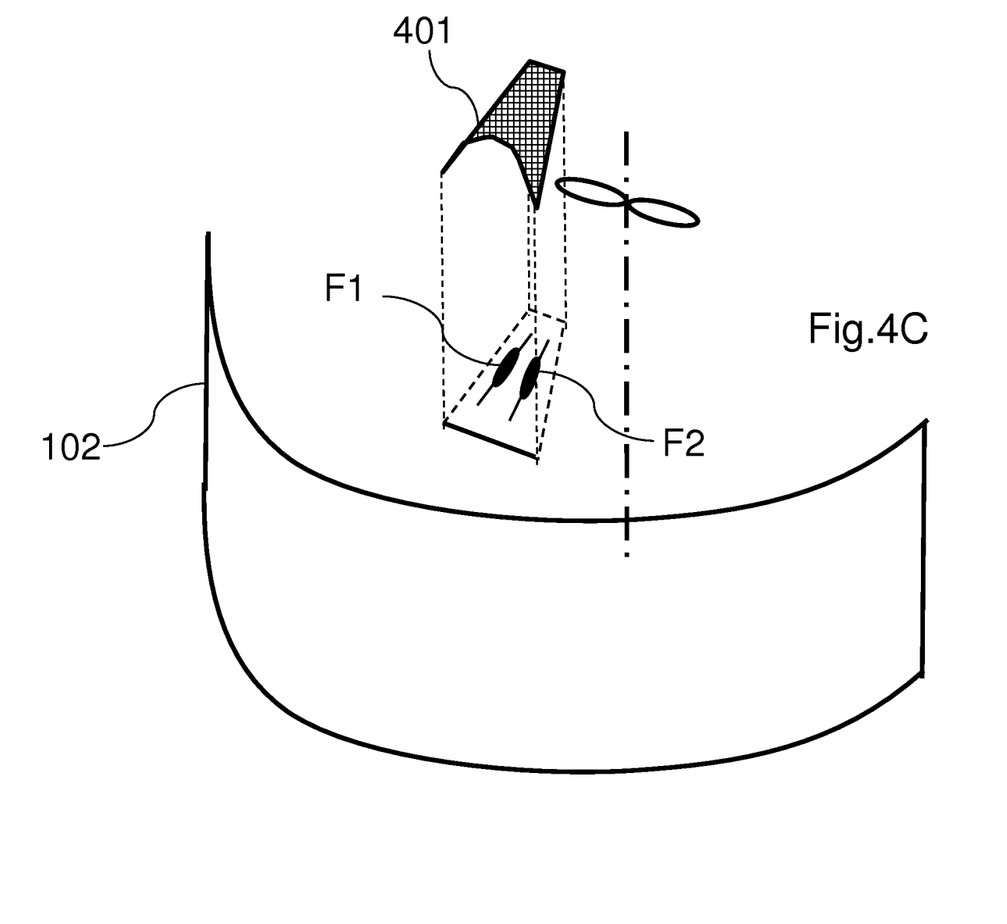

Advantageously, as depicted in FIG. 4A, the cover element 106 forms a cavity 401. Having a cover element forming a cavity allows a better air isolation of the thermal fuse system 105 from the cool air 104. Only the front side is opened, which is advantageous to connect the electrical cables (not shown) to the thermal fuse system 105. Alternatively, as depicted in FIG. 4B, the cavity 401 has a curved transversal cross-section to offer a low aerodynamic air resistance. FIG. 4C depicts an exploded corresponding view showing the thermal fuse system with a first thermal fuse F1 and a second thermal fuse F2.

Figure 5:
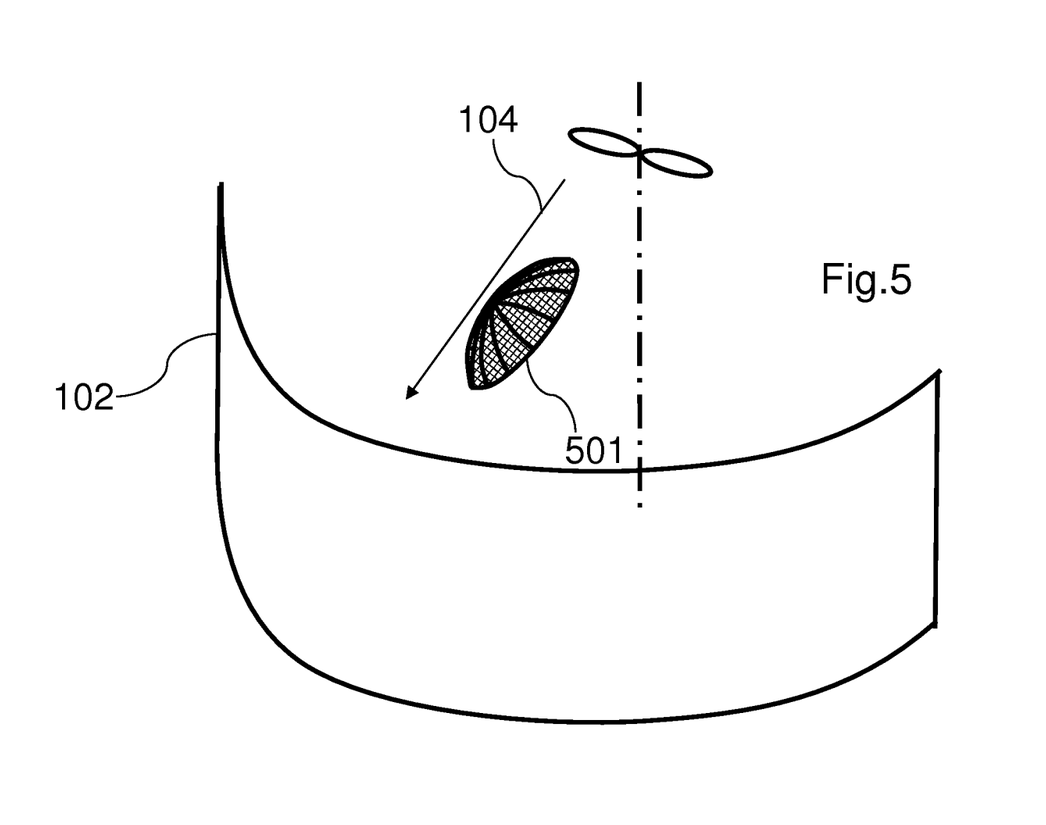
FIG. 5 depicts a cover element forming a capsule, used in an apparatus according to the invention.

Advantageously, as depicted in FIG. 5, the cover element 106 forms a closed capsule 501. This shape allows an air-tight isolation of the thermal fuse system 105. The electrical cables (not shown) need to be connected to the thermal fuse system 105 either below the capsule, or via holes made in the capsule wall.

The cover element 106 has a geometry (i.e. shape) defining a certain volume of air between the cover element 106 and the outer wall 102. This volume of air corresponds to the volume below the cover element, delimited by the projection of the perimeter of the cover element 106 on the outer wall 102. The higher this volume, the less sensitive the thermal fuse system 105 is with regards to cool air 104 circulating in the apparatus. The other way around, the smaller this volume, the more sensitive the thermal fuse system 105 is with regards to cool air 104 circulating in the apparatus. For a given thermal fuse system 105 having a given and fixed cut-off temperature, it is thus possible to fine-tune at which temperature of the apparatus the thermal fuse system 105 will actually trigger. For example, if the thermal fuse system 105 has a given fixed cut-off temperature of 172° C., reducing the volume of air between the cover element 106 and the outer wall 102 will tend to increase the temperature of the thermal fuse system 105, resulting in that the thermal fuse system 105 may trigger faster and reduce the risk for the consumer.

Preferably, if the apparatus is a home appliance, the cover element 106 has a geometry defining a volume of air between the cover element 106 and the outer wall 102 in the range [1 cm$^3$; 30 cm$^3$].

The cover element 106 is preferably made of material withstanding the temperature of the apparatus 100 after the triggering action of the thermal fuse system 105. For example, the cover element 106 is made of silicon or steel.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. An apparatus for preparing food, said apparatus comprising:
   a food preparation chamber having an outer wall;
   an air heating system to circulate hot air inside the food preparation chamber;
   an air cooling system to circulate cool air on said outer wall outside the food preparation chamber;
   a thermal fuse system to cut an electrical supply of said apparatus when a temperature of the thermal fuse system exceeds a given threshold (TH), the thermal fuse system being attached to said outer wall outside the food preparation chamber; and
   a cover element placed at a proximity of said thermal fuse system to protect the thermal fuse system from the cool air.

2. Apparatus as claimed in claim 1, wherein the cover element forms a deflector.

3. Apparatus as claimed in claim 1, wherein the cover element forms a cavity with closed lateral sides.

4. Apparatus as claimed in claim 1, wherein the cover element forms a closed capsule.

5. Apparatus as claimed in claim 1, wherein the cover element has a geometry defining a volume of air between the cover element and the outer wall in a range.

6. Apparatus as claimed in claim 1, wherein the thermal fuse system is placed on an upper part of said outer wall.

7. Apparatus as claimed in claim 1, wherein the thermal fuse system is placed on a lateral part of said outer wall.

8. Apparatus as claimed in claim 1, wherein the cover element is made of material withstanding a temperature of the apparatus after a triggering action of the thermal fuse system.

9. Apparatus as claimed in claim 1, wherein the cover element is made of silicon.

10. Apparatus as claimed in claim 1, wherein the cover element is made of steel.

11. Apparatus as claimed in claim 1, wherein the thermal fuse system comprises a first and a second thermal fuses (F1, F2) to cut a first and a second electrical supply inputs of the apparatus, respectively.

* * * * *